United States Patent [19]

Takeuchi et al.

[11] Patent Number: 4,916,191

[45] Date of Patent: Apr. 10, 1990

[54] GRAFT COPOLYMER HAVING DISPERSION STABILIZING EFFECT, A PROCESS FOR PRODUCING THE SAME, AND A PROCESS OF EMULSION POLYMERIZATION USING THE SAME

[75] Inventors: Fumikatsu Takeuchi; Tsutomu Takeuchi; Noriyuki Osaka; Yoichi Takizawa; Susumu Kawase, all of Sayama, Japan

[73] Assignee: Soken Kagaku Kabushiki Kaisha, Tokyo, Japan

[21] Appl. No.: 66,813

[22] Filed: Jun. 25, 1987

[30] Foreign Application Priority Data

Jul. 1, 1986 [JP] Japan ................................ 61-154845

[51] Int. Cl.$^4$ .......................... C08L 51/00; C08F 2/22
[52] U.S. Cl. .................................... 525/276; 525/242; 526/201
[58] Field of Search ................. 525/276, 242; 526/201

[56] References Cited

U.S. PATENT DOCUMENTS

| | | | |
|---|---|---|---|
| 3,245,971 | 4/1966 | Iserson | 526/211 |
| 3,317,635 | 5/1967 | Osmond | 525/296 |
| 3,574,791 | 4/1971 | Sherman et al. | 525/276 |
| 3,666,693 | 5/1972 | Chapiro et al. | 525/276 |
| 3,786,116 | 1/1974 | Milkovich et al. | 525/276 |
| 3,875,262 | 4/1975 | Milne | 525/200 |
| 4,022,737 | 5/1977 | Sekmakas et al. | 525/276 |
| 4,564,561 | 1/1986 | Lore et al. | 525/200 |
| 4,622,288 | 11/1986 | Yokoyama | 430/527 |
| 4,716,002 | 12/1987 | Fujimatsu et al. | 525/276 |
| 4,732,941 | 3/1988 | Numa | 525/276 |

FOREIGN PATENT DOCUMENTS

| | | | |
|---|---|---|---|
| 61-275364 | 5/1985 | Japan | 525/276 |
| 1443074 | 7/1976 | United Kingdom . | |

*Primary Examiner*—Carman J. Seccuro
*Attorney, Agent, or Firm*—Koda & Androlia

[57] ABSTRACT

A graft copolymer having dispersion stabilizing effect, which is a product of the polymerization of 5 to 30% by weight of a macromonomer which has a molecular weight of 1,000 to 100,000 and has a radical polymerizable unsaturated group at its one end, 1 to 40% by weight of a hydrophillic monomer which has a hydrophillic moiety in it and has a radical polymerizable unsaturated group, and 5 to 40% by weight of a fluorinated monomer which has a florinated moiety in it and has a radical polymerizable unsaturated group, the % by weight being based on a total of the three monomers, and 0 to 50% of the total of the total of the three monomers of a monomer copolymerizable therewith. The graft copolymer of this invention can be used as an excellent dispersion stablilizer for emulsion polymerization, whereby in emulsion polymerization it is possible to attain polymer particle dispersion stability to ensure that the polymer particles will not be agglomerated even if they have been grown to larger particles having a diameter of 0.5 $\mu$ or more and that dispersion of the polymer particles having a large and uniform particle diameter is obtained.

4 Claims, No Drawings

GRAFT COPOLYMER HAVING DISPERSION STABILIZING EFFECT, A PROCESS FOR PRODUCING THE SAME, AND A PROCESS OF EMULSION POLYMERIZATION USING THE SAME

BACKGROUND OF THE INVENTION

This invention relates to a novel and useful graft copolymer. More particularly, it relates to a graft copolymer having dispersion stabilizing effect, a process for producing it and a process of emulsion polymerization of vinyl monomers using the graft copolymer as a dispersion stabilizer.

In emulsion polymerization, monomers incorporated in micelles of an emulsifier (surface active agent) are polymerized into polymer particles. These particles generally have small diameters ranging from 0.05 $\mu$ to 1 $\mu$, so that it is difficult to remove the emulsifier from the polymer produced. Therefore, there has been developed an emulsifier-free emulsion polymerization method which uses no surface active agent. In this method, polymerization is in principle carried out with only a polymerization initiator without any dispersion stabilizer, or polymerization is carried out by preliminarily polymerizing or emulsion polymerizing a water-soluble monomer thus forming into an easily water-soluble or water-dispersible dispersion. Alternately, polymerization is carried out by previously adding a highly water-soluble or water-dispersible dispersion stabilizer or a water-soluble polymer compound. The dispersion stabilizer used in this case comprises a hydrophobic carbon backbone and a side chain having hydrophilic groups and is classified as a linear polymer on the basis of its polymer structure.

According to the emulsifier-free emulsion polymerization method with the use of this dispersion stabilizer, a dispersion having a uniform particle size in the range of ca. 0.1~0.5 $\mu$ is obtained.

In the aforementioned emulsifier-free emulsion polymerizations method using the dispersion stabilizer, however, preparation of a dispersion containing polymer particles having a particle size of 0.5 $\mu$ or more will result in the distribution of the particle diameter over a wide range or the agglomeration of the polymer particles forming into a large amount of agglomerate, which makes it difficult to conduct stable emulsion polymerization.

SUMMARY OF THE INVENTION

This invention is based on the above described background. An object of this invention is to provide a novel graft copolymer which is useful as a dispersion stabilizer for emulsion polymerization, a process for producing the same and a method of emulsion polymerization using the graft copolymer as a dispersion stabilizer.

We have conducted researches for providing a novel and useful dispersion stabilizer. As a result, we have found that a graft copolymer whose functions such as hydrophilicity and hydrophobicity have been clearly defined is useful for achieving the objects of this invention. On the basis of this discovery we have arrived at this invention.

More specifically, the graft copolymer having dispersion stabilizing effect according to this invention has on the carbon backbone thereof a polymer side chain comprising a carbon chain having a molecular weight of 1,000 to 100,000, a fluorine atom containing a fluorine side chain, preferably a fluorine side chain containing a fluorinated alkyl or alkylene group, and a hydrophilic side chain containing a hydrophilic group such as a hydroxyl group, a carboxyl group or a salt form thereof or a sulfo group or a salt form thereof, the total mean molecular weight of said graft copolymer being 5,000 or more.

A process for producing the graft copolymer having dispersion stabilizing effect according to this invention comprises radical copolymerizing as monomers a macromonomer having a radical polymerizable unsaturated group at one end and a molecular weight of 1,000 to 100,000, a hydrophilic compound having a radical polymerizable unsaturated group and a fluorine type compound having a radical polymerizable unsaturated group.

As one preferred embodiment of the production process according to this invention, the macromonomer, the fluorine type compound and the hydrophilic compound are used respectively in a proportion of 5 to 30% by weight, 5 to 40% by weight and 1 to 40% by weight per total weight of the monomers.

Furthermore, as another preferred embodiment, a copolymerizable compound in addition to the aforementioned monomers is used as a monomer in a proportion of 50% by weight or less per total weight of the monomer.

As a preferred embodiment of this invention, the fluorine type compound is replaced with an unsaturated carboxylic acid having a fluorinated alkyl or alkylene group or an ester thereof.

The process of emulsion polymerization using the dispersion stabilizer according to this invention comprises adding in the production of the polymer dispersion by emulsion polymerization of vinyl type monomers a graft copolymer having on the carbon backbone a polymer side chain comprising a carbon chain having a molecular weight of 1,000~100,000, a fluorine atom containing fluorine side chain, and a hydrophilic side chain containing a hydrophilic group, the total mean molecular weight of said graft copolymer being 5,000 or more.

As one of the preferred embodiments of this invention, the dispersion stabilizer is added in a proportion of 0.001~5 parts by weight (solid content) per 100 parts by weight of the vinyl type monomers.

The graft copolymer according to this invention has a structure in which respective functions are definitely separated, and the side chains and the backbone have respectively high affinity for or repulsion to a polymerization medium and a monomer for emulsion polymerization.

The reasons for this dispersion stabilizing activity of this graft copolymer are that (a) the aggregate of the graft copolymer provides the species for emulsion polymerization therein thus reducing the number of polymer particles, and (b) the graft copolymer covers the surface of the polymer particles thus produced and acts as a protective colloid for stabilizing the polymer particles.

As for the effects and functions of respective side chains, the polymer side chains, which are either hydrophilic or hydrophobic, have high affinity to each other, so that the agglomerate particles of the graft copolymer formed by the agglomeration of these side chains provides the species for polymerization of the polymer particles. If the polymer side chain is hydrophobic, the backbone part covers the surface of the polymer particles, while the side chains enter into the polymer particles as anchors to promote the dispersion stabilizing effect. If the polymer is hydrophilic, the backbone part enters partly into the polymer particles, while the polymer side chains cover the surface of the polymer particles to promote the dispersion stabilizing effect. The fluorine side chain protrudes from the backbone part on the surface of the polymer particles toward a polymerization medium to prevent fusing or agglomeration caused by the collision of the polymer particles and to provide a stable dispersion system. This will be understood from the observation that when the fluorine content in the graft copolymer is increased, in other words, when the fluorine side chain has a larger number of fluorine substituents, the particle diameter of the polymer particles is also increased. Furthermore, the hydrophilic side chains make the whole graft copolymer water-soluble and improve the dispersibility of the polymer particles thus stabilizing the emulsion polymerization. This explanation intends to assist the understanding of this invention but not to limit the scope of this invention.

According to this invention, the graft copolymer having the aforementioned activities provides a preferred dispersion stabilizer for emulsion polymerization. Thus, on emulsion polymerization it is possible to afford the polymer particles dispersion stability to ensure that the polymer particles will not be agglomerated even if they have grown to larger particles having a diameter of 0.5 μ or more and that dispersion of the polymer particles having a large and uniform particle diameter is obtained.

Furthermore, the polymer particles obtained by emulsion polymerization using the graft copolymer as a dispersion stabilizer produce a resin or film of excellent transparency upon the drying of the dispersion of the polymer particles, since the polymer component as a constituent of the polymer particles and the graft copolymer become integral with each other.

DETAILED DESCRIPTION OF THE INVENTION

A. Graft copolymer

The graft copolymer according to this invention has a structure in which each of the backbone and the side chains has high affinity for or repulsion force to a polymerization medium such as water, organic solvents or the like and monomers for emulsion polymerization. Respective segments of the graft copolymer have definitely separate functions.

More specifically, the graft copolymer according to this invention has the following side chains on its backbone:

(a) the polymer chain comprising a carbon chain which has a molecular weight corresponding amount in the range of 1,000~100,000, preferably in the range of 3,000~50,000, (b) the fluorine side chain containing fluorine atoms, and (c) the hydrophilic side chain containing hydrophilic groups.

In this invention, the polymer side chain can form side chains thereon by chemical bond with functional groups such as hydrophilic and hydrophobic groups depending on the functions to be imparted to the polymer side chain. The side chain is a linear or branched chain, substantially comprising a carbon chain and may contain hereto atoms other than carbon in its chain. The molecular weight of the polymer side chain corresponding to molecular weight is, for example, in the range of 1,000~100,000, preferably in the range of 3,000~50,000.

In this invention, the fluorine side chain is, for example, a hydrocarbon group in which hydrogen atoms have been substituted with fluorine atoms or one containing fluorinated substituents. The length of the chain, the bonding mode of the chain, the presence or absence of functional groups bonded to the chain may be altered appropriately depending on the kinds of dispersion stabilizers.

In this invention, the hydrophilic side chain is intended to impart the side chain hydrophilicity and has hydrophilic groups. Examples of the hydrophilic groups are a carboxyl group or an alkali metal, amine or ammonium salt thereof; a sulfo group or an alkali metal, amine or ammonium salt thereof; a quaternarized product or acid neutralized product of a basic nitrogen containing vinyl monomer such as dimethylaminoethylmethacrylate and diethylaminoethylmethacrylate represented by the following general formula

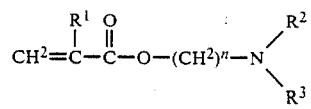

wherein: $R^1$ represents hydrogen or an alkyl group having 1~5 carbon atoms; and $R^2$ and $R^3$ represent hydrogen or alkyl groups having 1~6 carbon atoms; and n denotes an integer.

The total mean molecular weight of the graft copolymer of this invention is 5,000 or more, preferably 10,000 or more. The graft copolymer may be a giant polymer in the micro gel form as long as it has a dispersion stabilizing effect. If the graft copolymer has a molecular weight less than 5,000, the hydrophobic and hydrophilic properties of the graft copolymer are not satisfactorily exhibited with respect to the polymerization medium such as water, an organic solvent or the like or an emulsion polymerization monomer, thus decreasing the controllability of the polymer particles in emulsion polymerization or the stabilizing effect of emulsion polymerization.

B. Production process

The production process according to this invention comprises radically copolymerizing the macro monomer, the fluorine type compound and the hydrophilic compound as monomers.

Macro monomer

The macro monomer used in this invention has a radical polymerizable unsaturated group at one end and a molecular weight of 1,000~100,000. The production of the macro monomer is carried out, for example, first of all by radical polymerization of an ethylenic unsaturated monomer in the presence of an initiator having a functional group which is capable of condensation reaction and a chain transfer agent to prepare an addition polymer containing a terminal functional group which is capable of condensation reaction, then reacting the functional group with, for example, an epoxy compound having a vinyl group to form a polymer having a vinyl group at the terminal, that is, the macro monomer.

Examples of the ethylenic unsaturated monomer used in the production of the macro monomer are acrylamide, methacrylamide, N-methylol acrylamide, N-methylol methacrylamide, 2-methoxyethyl acrylate, 2-methoxyethyl methacrylate, diacetone acrylamide, hydroxyethyl acrylate, hydroxypropyl acrylate, hydroxybutyl acrylate, hydroxyethyl methacrylate, hydroxypropyl methacrylate, hydroxybutyl methacrylate, an acrylate ester of a polyvalent alcohol, a methacrylate ester of a polyvalent alcohol, vinyl pyrrolidone and the like. Other copolymerizable monomers include acrylamide and a derivative thereof, methacrylamide and a derivative thereof, an N-methylol acrylamide derivative, an N-methylol methacrylamide derivative, ethyl carbitol acrylate, methyl triglycol acrylate, 2-hydroxyethylacroyl phosphate and butoxyethyl acrylate. As the ethylenic unsaturated monomers, there are α,β-unsaturated carboxylic acid esters such as methyl methacrylate, methyl acrylate and the like; aromatic vinyl monomers such as styrene and the like; vinyl esters such as vinyl acetate and the like; acrylonitrile and the like.

As the initiators used in the preparation of the macro monomer, there are 4,4'-azobis-4-cyanovalerianic acid, 2,2'-azobis-2-amidinopropane hydrochloride, potassium peroxide, ammonium peroxide, azobisisobutyronitrile, benzoyl peroxide and the like.

As the epoxy compound having an ethylenic unsaturated group which can be used for the preparation of the macro monomer, there are, for example, glycidyl acrylate, 2-methylglycidyl acrylate, glycidyl methacrylate, 2-methylglycidyl methacrylate, allyl glycidyl ether, and allyl 2-methylglycidyl ether.

Fluorine type compound

The fluorine type compound used in this invention is a compound having a radical polymerizable unsaturated group. Examples thereof are vinyl monomers having a fluorinated alkyl group or a fluoroalkyl group, which include trifluoroethyl methacrylate, 3-(p-octadecylfluoro)-2-oxybenzoyloxy-2-hydroxypropyl methacrylate, tetrafluoropropyl methacrylate, 3-methyl-4[perfluoro(7-methyl-1-octyl)]butyl acrylate, 2-(N,N-propylperfluorooctyl sulfoneamide)ethyl methacrylate, 2-(perfluorooctyl)ethyl(meth)acrylate, 3,3,3trifluoropropylene methacrylate, hexafluoropropylene methacrylate, and dichlorohexafluorobutene 2-methacrylate. Compounds represented by the following formulae can also be used.

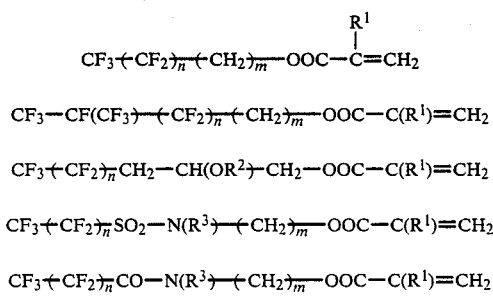

(wherein $R^1$ represents H, $CH_3$, $CHF_2CH_2F$ or $CF_3$; $R^2$ represents H or $CH_3CO$; and $R^3$ represents H or $CH_3$.)

Hydrophilic compound

The hydrophilic compound used in this invention is a compound which contains hydrophilic functional groups and radical polymerizable unsaturated groups. Examples of the hydrophilic are carboxyl groups, sulfo groups and salts thereof such as alkali metal salts, amine salts, and ammonium salts. Examples of the compound are radical polymerizable unsaturated carboxylic acids, radical polymerizable unsaturated sulfonic acids, and salts thereof. Specific examples of the hydrophilic compounds are unsaturated monocarboxylic acids such as acrylic acid, crotonic acid, isocrotonic acid, vinylacetic acid, methacrylic acid, angelic acid, tiglic acid, and allylacetic acid; unsaturated dicarboxylic acids such as maleic acid, fumaric acid, citraconic acid, methylfumaric acid, glutaconic acid, itaconic acid, and allylmalonic acid and monoalkyl esters thereof; 2-acrylamide-2-methylpropanesulfonic acid, vinylsulfonic acid, allylsulfonic acid, 2-methylallylsulfonic acid, styrenesulfonic acid, 2-sulfoethyl methacrylate, and 2-sulfopropyl acrylate.

Miscellaneous unsaturated monomers

In this invention, in addition to the aforementioned monomers such as the macro monomer, the fluorine type compound and the hydrophilic compound, an unsaturated monomer copolymerizable with said monomers may be added. Examples of suitable monomers are aromatic vinyl monomers such as styrene, vinyltoluene, a-methylstyrene, and chlorostyrene; conjugated diene monomers such as butadiene, isoprene, and chloroprene; acrylic acid esters and methacrylic acid esters such as methyl acrylate, ethyl acrylate, butyl acrylate, methyl methacrylate, and ethyl methacrylate butyl methacrylate; halogenated vinyls and vinylidenes such as vinyl chloride, vinyl bromide, vinylidene chloride, and vinylidene bromide; vinyl esters such as vinyl acetate and vinyl propionate.

Production conditions

The amounts of the macro monomer, the fluorine type compound and the hydrophilic compound to be used as the starting substances are desirably selected appropriately in accordance with the kinds and structures of the desired graft copolymer and other factors. The amounts to be used are, for example, in a proportion of 5 to 30% by weight, 5 to 40% by weight and 1 to 40% by weight to the total monomer weight, respectively.

When another copolymerizable compound is added, the amount used is in a proportion of, for example, 50% by weight or less per total monomer weight.

The reaction medium is appropriately selected according to the kinds of starting substances such as the macro monomer and includes methyl ethyl ketone and the like.

It is desirable to select the reaction temperature, reaction environment, reaction atmosphere and other factors according to the starting substance and the reaction medium.

C. Emulsion polymerization

Using the graft copolymer of this invention as a part or all of the dispersion stabilizer, the vinyl type monomer is subjected to emulsion polymerization to form a dispersion of the polymer.

For the vinyl type monomer used in this invention, one which is usually used for emulsion polymerization is suitable. Examples of such monomers are styrene, vinyltoluene, a-methylstyrene, and chlorostyrene; conjugated diene monomers such as butadiene, isoprene, and chloroprene; acrylic acid esters and methacrylic acid esters such as methyl acrylate, ethyl acrylate, butyl acrylate, methylmethacrylate, and ethyl methacrylate butyl methacrylate; halogenated vinyls and vinylidenes such as vinyl chloride, vinyl bromide, vinylidene chloride, and vinylidene bromide; vinyl esters such as vinyl acetate and vinyl propionate.

Emulsion polymerization according to this invention can be carried out in, for example, water or a mixed solvent such as an organic solvent and water. Examples of organic solvents used in this reaction are alcohols such as methanol, ethanol, and IPA; cellosolves such as methyl cellosolve and ethyl cellosolve; glycols such as ethylene glycol and diethylene glycol. Initiators which can be used in this polymerization are initiators used in the emulsion polymerization of usual vinyl type monomers. Such initiators include, for example, azobisisobutyronitrile, potassium persulfate, ammonium peroxide, benzoyl peroxide, 4,4'-azobis-4-cyanovalerianic acid, and 2,2'-azobis-2-amidinopropane hydrochloride.

The dispersion stabilizer for emulsion polymerization is added in a proportion of 0.001 to 5 parts by weight (solid content), preferably 0.001 to 1 part by weight to 100 parts of the vinyl type monomer.

EXAMPLES

Production Example 1

Into a one-liter four-necked flask equipped with a reflux condenser, a thermometer, a nitrogen blowing tube and a stirrer were charged 300 parts of methyl ethyl ketone, 300 parts of the monomer blend according to the composition shown in Table 1 and 1.5 parts of azobisisobutyronitrile. The mixture was maintained at a temperature of 70°±2° C. under a nitrogen stream for 8 hours thus accomplishing graft polymerization reaction.

Then, the resulting polymer was poured into methanol to cause precipitation, and the precipitate was dried and pulverized. Aqueous ammonia was added to the powder while attention was paid to the pH, and a fluorine containing graft copolymer (1) having good water-solubility or water-dispersibility was obtained.

Production Examples 2 to 5

According to the compositions shown in Table 1, graft copolymers (B), (C), (D) and (E) were obtained in the same manner as in Production Example 1.

TABLE 1

| Monomer Component | Production Example No. 1 | Production Example No. 2 | Production Example No. 3 | Production Example No. 4 | Production Example No. 5** |
|---|---|---|---|---|---|
| 2-(Perfluorooctyl)-ethyl methacrylate | 120 | 90 | 60 | 60 | 60 |
| Methyl methacrylate macro monomer* | 60 | 60 | 60 | 30 | 30 |
| Methacrylic acid | 60 | 60 | 60 | 60 | |
| 2-Hydroxyethyl acrylate | 60 | 90 | 90 | 90 | 90 |
| Methyl methacrylate | | | 30 | 60 | 60 |
| 2-Acrylamide-2-methylpropane sulfonic acid | | | | | 60 |
| Fluorine-containing graft copolymer | (A) | (B) | (C) | (D) | (E) |

*M.W. = 5,500.
**DMF was used as a polymerization solvent.

Production Examples 6~10

According to the monomer compositions shown in Table 2, graft copolymers (F), (G), (H), (I) and (J) were obtained in the same manner as in Production Example 1.

TABLE 2

| Monomer Component | Production Example No. 6 | Production Example No. 7 | Production Example No. 8 | Production Example No. 9 | Production Example No. 10** |
|---|---|---|---|---|---|
| 2-(Perfluorooctyl)-ethyl methacrylate | 120 | 90 | 60 | 60 | 60 |
| N-Methylol acrylamide macro monomer* | 60 | 60 | 60 | 30 | 30 |
| Methacrylic acid | 60 | 60 | 60 | 60 | |
| Methyl methacrylate | 60 | 90 | 120 | 150 | 150 |
| 2-Acrylamide-2-methylpropane sulfonic acid | | | | | 60 |
| Fluorine-containing graft copolymer | (F) | (G) | (H) | (I) | (J) |

*M.W. = 5,500.
**DMF was used as a polymerization solvent.

Production Example 11

Into a one-liter four-necked flask equipped with a reflux condenser, a thermometer, a nitrogen blowing tube and a stirrer were charged 300 parts of methyl ethyl ketone, 90 parts of 2-(N,N-propylperchlorooctyl sulfonamide)-ethyl methacrylate, 60 parts of 2-hydroxyethyl methacrylate macro monomer (m.w.=10,000), 60 parts of methacrylic acid, 30 parts of methyl methacrylate and 1.5 parts of azobisisobutyronitrile. The mixture was maintained at a temperature of 70°±2° C. under a nitrogen stream for 8 hours thus accomplishing the polymerization reaction. Then, the resulting polymer was poured into methanol to cause precipitation, and the precipitate was dried, pulverized and added to 0.7 equivalent of an aqueous KOH solution, whereupon a water-soluble fluorine containing graft copolymer (K) was obtained.

Comparative Example 1

Into a one-liter four-necked flask equipped with a reflux condenser, a thermometer, a nitrogen blowing tube and a stirrer were charged 300 parts of methyl ethyl ketone and 60 parts of N-methylol acrylamide in place of 60 parts of N-methylol acrylamide macro monomer as in Production Example 6, the other conditions of which were used. In the same manner as in Production Example 6, a water-soluble fluorine-containing random copolymer (i) was obtained.

Comparative Example 2

Into a one-liter four-necked flask equipped with a reflux condenser, a thermometer, a nitrogen blowing tube and a stirrer were charged 300 parts of methyl ethyl ketone and 90 parts of decyl methacrylate in place of 90 parts of 2-(perfluorooctyl)ethyl methacrylate as in Production Example 6, the other conditions of which were used. In the same manner as in Production Example 6, a water-soluble graft copolymer (ii) was obtained.

Emulsion polymerization Example 12

Into a one-liter separable flask equipped with a reflux condenser, a thermometer, a nitrogen blowing tube and a stirrer were introduced 200 parts of distilled water, 100 parts of methyl methacrylate (MMA) and fluorine-containing graft copolymer (F) synthesized in Production Example 6 in an amount of 0.02 part in terms of solid content. Under a nitrogen stream and in a constant stirring state, 0.3 part of potassium persulfate (KPS) as a polymerization initiator was added, and the temperature of the reaction system was raised up to 65° C., at which temperature polymerization was started. Then, the reaction system was maintained at the temperature of 82° C., and the polymerization was accomplished in about 3 hours. Filtration of the dispersion with a 400-mesh metal net gave only a very small amount, that is, 0.8 part of agglomerate. When the polymer particles were observed by a scanning type electron microscope, they were found to have a particle diameter of 2.5 µ and almost monodisperse particle diameter distribution.

Emulsion Polymerization Example 13

Under the conditions in Emulsion Polymerization Example 12, emulsion polymerization was carried out with the amount of the fluorine-containing graft copolymer (F) reduced to 0.1 part in terms of solid content. The polymer dispersion obtained was stable, and the agglomerate was decreased to an amount of 0.6 part. The particle diameter of the polymer particles was 2.4 µ and had almost monodisperse distribution.

Emulsion Polymerization Examples 14 to 17

Under the conditions in Emulsion Polymerization Example 12, emulsion polymerization of MMA was carried out by replacing the fluorine-containing graft copolymer (F) respectively with the fluorine-containing graft copolymers (B), (C), (D) and (E) which were added respectively in an amount of 0.02 part in terms of solid content. The properties of the polymer dispersion obtained are shown in Table 3. The polymer particles were in every case spherical and of monodisperse type.

TABLE 3

| Example | Properties dispersion stabilizer | Polymerization stability | Yield of agglomerate (wt. %) | Mean particle diameter (µ) |
|---|---|---|---|---|
| 14 | (B) | good | 0.3 | 3.2 |
| 15 | (C) | good | 0.1 | 2.6 |
| 16 | (D) | good | 0.2 | 1.8 |
| 17 | (E) | good | 0.5 | 2.0 |

Emulsion Polymerization Examples 18~21

Under the conditions in Emulsion Polymerization Example 12, emulsion polymerization of MMA was carried out by replacing the fluorine-containing graft copolymer (F) respectively with the fluorine-containing graft copolymers (G), (H), (I) and (J) which were added respectively (G), (H), (I) and (J) which were added respectively in an amount of 0.02 part in terms of solid content. The properties of the polymer dispersion obtained are shown in Table 4. The polymer particles were in every case spherical and of monodisperse type.

TABLE 4

| Example | Properties dispersion stabilizer | Polymerization stability | Yield of agglomerate (wt. %) | Mean particle diameter (µ) |
|---|---|---|---|---|
| 18 | (G) | good | 0.5 | 3.2 |
| 19 | (H) | good | 0.4 | 2.4 |
| 20 | (I) | good | 0.5 | 1.5 |
|    | (J) | good | 0.7 | 1.7 |

Emulsion Polymerization Example 22

Into a one-liter separable flask equipped with a reflux condenser, a thermometer, a nitrogen blowing tube and a stirrer were introduced 200 parts of distilled water, 60 parts of methyl methacrylate, 30 parts of butyl acrylate, 10 parts of styrene, 1 part of sodium hydrogen sulfite and fluorine-containing graft copolymer (K) obtained in Example 11 in an amount of 0.4 part in terms of solid content. Under a nitrogen stream and in a constant stirring state, the mixture was heated to a temperature of 70° C. When the temperature of the system reached 70° C., 2 parts of potassium persulfate was added, and polymerization was started. Then, the reaction system was maintained at a temperature of 75° C., and the polymerization was accomplished in about 6 hours.

Filtration of the dispersion with a 400-mesh metal net produced substantially no agglomerate with slight adhesion to the stirring blades. The particle diameters of the polymer particles were in a range of 2.5~3 µ, and fine particles having a diameter of 1 µ or less were not observed.

Comparative Example 3

Under the conditions in Emulsion Polymerization Example 12, emulsion polymerization was carried out by adding the fluorine-containing random copolymer (i) in an amount of 0.02 part in terms of solid content. The polymer particles obtained had a diameter of 0.4 µ, and the particle diameter distribution was appreciably wide in a range of 0.25~0.6 µ.

Comparative Example 4

Under the conditions in Emulsion Polymerization Example 12, emulsion polymerization was carried out by adding the graft copolymer (D) in an amount of 0.02 part in terms of solid content. A large amount of agglomerate was produced. Filtration of the reaction with a 400-mesh metal net produced an agglomerate in an amount of 3.5 parts. The particle diameter distribution of the polymer particles obtained was sharp.

Production Example 23

Into a one-liter four-necked flask equipped with a reflux condenser, a thermometer, a nitrogen blowing tube and a stirrer were charged 300 parts of methyl ethyl ketone, 300 parts of the monomer blend according to the composition shown in Table 5 and 1.5 parts of azobisisobutyronitrile. The mixture was maintained at a temperature of 70°±2°C. under a nitrogen stream for 8 hours thus accomplishing the graft polymerization.

Then, resulting polymer was poured into methanol to cause precipitation, and the precipitate was dried, pulverized and added to an aqueous sodium hydroxide solution which attention was paid to the pH. A fluorine-containing graft copolymer (L) having a good water-solubility or water-dispersibility was obtained.

Production Examples 24 and 25

According to the compositions shown in Table 5, graft copolymers (M) and (N) were obtained in the same manner as in Production Example 23.

TABLE 5

| Monomer Component | Production Example No. 23 | Production Example No. 24 | Production Example No. 25 |
|---|---|---|---|
| 2-(Perfluorooctyl)-ethyl methacrylate | 90 | 60 | |
| Trifluoroethyl methacrylate | | | 60 |
| Methacrylic acid | 60 | 60 | 60 |
| 2-Hydroxyethyl acrylate | 60 | 60 | 60 |
| n-Butyl acrylate | 30 | 90 | 90 |
| n-Butyl acrylate macromonomer* | 60 | 30 | 30 |
| Fluorine-containing graft copolymer | (L) | (M) | (N) |

*M.W. = 6,000

Emulsion Polymerization Example 26

Into a one-liter separable flask equipped with a reflux condenser, a thermometer, a nitrogen blowing tube and a stirrer were added 200 parts of distilled water, 100 parts of n-butyl acrylate (BA) and a fluorine-containing graft copolymer (L) synthesized in Production Example 23 in an amount of 0.05 part in terms of solid content. Under a nitrogen stream and in a constant stirring state, 0.3 part of potassium persulfate (KPS) as a polymerization initiator was added, and the temperature of the reaction system was raised to 65° C., at which temperature polymerization was started. Then, the reaction system was maintained at the temperature of 82° C., and the polymerization was accomplished in about 3 hours. The polymer dispersion obtained was stable. Filtration of the dispersion with a 400-mesh metal net produced 0.8 part of agglomerate. The particle diameter of the polymer particles obtained was 2.8 $\mu$ and the particle diameter distribution was almost monodisperse.

Emulsion Polymerization Examples 27 and 28

Under the conditions in Emulsion Polymerization Example 26, emulsion polymerization of BA was carried out by replacing the fluorine-containing graft copolymer (L) with the fluorine-containing graft copolymers (M) and (N) which were added respectively in an amount of 0.05 part in terms of solid content. The properties of the polymer dispersion obtained was as is shown in Table 6. The polymer particles were in every case spherical and of monodisperse type.

TABLE 6

| Example | Properties dispersion stabilizer | Polymerization stability | Yield of agglomerate (wt. %) | Mean particle diameter ($\mu$) |
|---|---|---|---|---|
| 27 | (M) | good | 0.6 | 2.1 |
| 28 | (N) | good | 0.5 | 1.2 |

Production Example 23

Into a one-liter four-necked flask equipped with a reflux condenser, a thermometer, a nitrogen blowing tube and a stirrer were charged 300 parts of methyl ethyl ketone, 300 parts of the monomer blend according to the composition shown in Table 7 and 1.5 parts of azobisisobutyronitrile. The mixture was maintained at a temperature of 70°±2° C. under a nitrogen stream for 10 hours, thus accomplishing graft polymerization. Then, the resulting polymer was poured into methanol to cause precipitation, and the precipitate was dried, pulverized and added to an aqueous ammonia while attention was paid to the pH. A fluorine-containing graft copolymer (O) having good water-solubility or water-dispersibility was obtained.

Production Examples 30 and 31

According to the compositions shown in Table 7, the graft copolymers (P) and (Q) were obtained in the same manner as in Production Example 29.

TABLE 7

| Monomer Component | Production Example No. 29 | Production Example No. 30 | Production Example No. 31 |
|---|---|---|---|
| 2-(Perfluorooctyl)-ethyl methacrylate | 90 | 60 | |
| Trifluoroethyl methacrylate | | | 60 |
| Methacrylic acid | 60 | 60 | 60 |
| 2-Hydroxyethyl acrylate | 60 | 60 | 60 |
| Styrene | 30 | 90 | 90 |
| Styrene-acrylonitrile macromonomer* | 60 | 30 | 30 |
| Fluorine-containing graft copolymer | (O) | (P) | (Q) |

*M.W. = 5,500

Emulsion polymerization Example 32

Into a one-liter separable flask equipped with a reflux condenser, a thermometer, a nitrogen blowing tube and a stirrer were introduced 200 parts of distilled water, 100 parts of styrene (ST) and a fluorine-containing graft copolymer (O) synthesized in Production Example 29 in an amount of 0.05 part in terms of solid content. Under a nitrogen stream and in the constant stirring state, 0.3 part of potassium persulfate (KPS) as a polymerization initiator was added, and the temperature of the reaction system was raised to 65° C., at which temperature polymerization was started. Then, the reaction system was maintained at a temperature of 82° C., and polymerization was accomplished in about 10 hours. The polymer dispersion obtained was stable. Filtration of the dispersion with a 400-mesh metal net produced 0.8 part of agglomerate. The particle diameter of the polymer particles obtained was 3.7 $\mu$ and the particle diameter distribution was almost monodisperse.

Emulsion Polymerization Examples 33 and 34

Under the conditions in Emulsion Polymerization Example 32, emulsion polymerization of ST was carried out by replacing the fluorine-containing graft copolymer (O) with the fluorine-containing graft copolymers (P) and (Q) which were added respectively in an amount of 0.02 part in terms of solid content. The properties of the polymer dispersion obtained was as is shown in Table 8. The polymer particles were in every case spherical and of monodisperse type.

TABLE 8

| Example | Properties dispersion stabilizer | Polymerization stability | Yield of agglomerate (wt. %) | Mean particle diameter (μ) |
|---|---|---|---|---|
| 33 | (P) | good | 0.7 | 3.2 |
| 34 | (Q) | good | 0.4 | 2.6 |

Production Example 35

Into a one-liter four-necked flask equipped with a reflux condenser, a thermometer, a nitrogen blowing tube and a stirrer were charged 300 parts of methyl ethyl ketone, 300 parts of the monomer blend according to the composition shown in Table 9 and 1.5 parts of azobisisobutyronitrile. The mixture was maintained at a temperature of 70°±2° C. under a nitrogen stream for 7 hours thus accomplishing graft polymerization. Then, the resulting polymer was poured into methanol to cause precipitation, and the precipitate was dried, pulverized and added to an aqueous ammonia while attention was paid to the pH. A fluorine containing graft copolymer (R) having good water-solubility or water-dispersibility was obtained.

Production Examples 36 and 37

According to the compositions shown in Table 9, the graft copolymers (S) and (T) were obtained in the same manner as in Production Example 35.

TABLE 9

| Monomer Component | Production Example No. 35 | Production Example No. 36 | Production Example No. 37 |
|---|---|---|---|
| 2-(Perfluorooctyl)-ethyl methacrylate | 90 | 60 | |
| Trifluoroethyl methacrylate | | | 60 |
| 2-Acrylamide-2-methylpropane sulfonic acid | 60 | 60 | 60 |
| 2-Hydroxyethyl acrylate | 60 | 60 | 60 |
| Methyl methacrylate | 30 | 90 | 90 |
| 2-Hydroxyethyl methacrylate macromonomer* | 60 | 30 | 30 |
| Fluorine-containing graft copolymer | (R) | (S) | (T) |

*M.W. = 5,000

Emulsion Polymerization Example 38

Into a one-liter separable flask equipped with a reflux condenser, a thermometer, a nitrogen blowing tube and a stirrer were added 200 parts of distilled water, 100 parts of methyl methacrylate (MMA) and a fluorine-containing graft copolymer (R) synthesized in Production Example 35 in an amount of 0.02 part in terms of solid content. Under a nitrogen stream and in a constant stirring state, 0.3 part of potassium persulfate (KPS) as a polymerization initiator was added, and the temperature of the reaction system was raised to 65° C., at which temperature polymerization was started. Then, the reaction system was maintained at a temperature of 82° C., and polymerization was accomplished in about 3 hours. The polymer dispersion obtained was stable. Filtration of the dispersion with a 400-mesh metal net produced 0.4 part of agglomerate. The particle diameter of the polymer particles obtained was 2.3 μ, and the particle diameter distribution was almost monodisperse.

Emulsion Polymerization Examples 39 and 40

Under the conditions in Emulsion Polymerization Example 38, emulsion polymerization of MMA was carried out by replacing the fluorine-containing graft copolymer (R) with the fluorine-containing graft copolymers (S) and (T) which were added respectively in an amount of 0.05 part in terms of solid content. The properties of the polymer dispersion obtained was as is shown in Table 10. The polymer particles were in every case spherical and of monodisperse type.

TABLE 10

| Example | Properties dispersion stabilizer | Polymerization stability | Yield of agglomerate (wt. %) | Mean particle diameter (μ) |
|---|---|---|---|---|
| 39 | (S) | good | 0.5 | 2.1 |
| 40 | (T) | good | 0.7 | 1.8 |

We claim:

1. In a process for aqueous emulsion polymerization of vinyl monomers where no surfactant is used but the polymer is obtained in emulsion as a result of a water-soluble or water dispersible polymeric dispersion stabilizer added, the improvement which comprises using as the polymeric dispersion stabilizer a graft copolymer of a mean molecular weight of at least 5,000 which is a product of polymerization of 5 to 30% by weight of a macromonomer which has a molecular weight of 1,000 to 100,000 and has a radical polymerizable unsaturated group at its one end, 1 to 40% by weight of a hydrophilic monomer which has a hydrophilic moiety in it selected from the group consisting of hydroxyl groups, carboxyl groups or salt forms thereof and has a radical polymerizable unsaturated group, and 5 and to 40% by weight of a fluorinated monomer which has a fluorinated moiety in it and has a radical polymerizable unsaturated group, the % by weight being based on a total of the three monomers, and 0 to 50% of the total of the three monomers of a monomer copolymerizable therewith thereby to produce an emulsion of a polymer of a mean particle diameter of at least 0.5 microns.

2. A process for emulsion polymerization according to claim 1, wherein said fluorine side chain contains fluorinated alkyl or alkylene groups.

3. A process for emulsion polymerization according to claim 1, wherein the hydrophilic group is selected from the group consisting of carboxyl groups, salt forms thereof, a sulfo group, and salt forms thereof.

4. A process for emulsion polymerization according to claim 1, wherein the amount of the dispersion stabilizer added is in a proportion of 0.001 to 5 parts by weight (solid content) per 1000 parts by weight of the vinyl monomers.

* * * * *